United States Patent
Moorman et al.

(10) Patent No.: US 8,382,626 B2
(45) Date of Patent: Feb. 26, 2013

(54) TRANSMISSION HYDRAULIC CONTROL SYSTEM HAVING AN ACCUMULATOR

(75) Inventors: Steven P. Moorman, Dexter, MI (US); Peter Donald Bock, Commerce Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 738 days.

(21) Appl. No.: 12/570,887

(22) Filed: Sep. 30, 2009

(65) Prior Publication Data

US 2011/0077124 A1 Mar. 31, 2011

(51) Int. Cl.
*F16H 61/4096* (2010.01)
(52) U.S. Cl. .......................... 475/129; 477/127; 477/150
(58) Field of Classification Search .......... 475/127–129; 477/127, 138, 143, 150, 155
See application file for complete search history.

(56) References Cited

U.S. PATENT DOCUMENTS

| | | | | |
|---|---|---|---|---|
| 4,665,774 A * | 5/1987 | Oguri | ............................. | 477/150 |
| 4,748,809 A * | 6/1988 | Sumiya et al. | ................... | 60/415 |
| 4,924,731 A * | 5/1990 | Hayakawa et al. | ........... | 475/129 |
| 5,288,279 A * | 2/1994 | Sakai et al. | ................... | 475/127 |
| 5,431,604 A * | 7/1995 | Marusue et al. | ............... | 475/123 |
| 6,146,311 A | 11/2000 | Moorman | | |
| 6,162,147 A | 12/2000 | Moorman | | |
| 7,578,761 B2 * | 8/2009 | Nishikawa et al. | ........... | 475/127 |

* cited by examiner

*Primary Examiner* — David D Le
*Assistant Examiner* — Huan Le

(57) ABSTRACT

A hydraulic control system for actuating at least one torque transmitting device in a transmission includes a sump, a pump in communication with the sump, and an accumulator. A first control device and a second control device control the communication of hydraulic fluid between the pump, the accumulator, and the torque transmitting device.

20 Claims, 12 Drawing Sheets

TRANSMISSION HYDRAULIC CONTROL SYSTEM HAVING AN ACCUMULATOR

FIELD

The present disclosure relates to a transmission hydraulic control system having an accumulator, and more particularly to a transmission hydraulic control system having an accumulator for actuating a torque transmitting device during an engine restart.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios. In the case of hybrid powertrains using a combination of the internal combustion (IC) engine and electric propulsion, these transmissions have a separate auxiliary electric pump for providing the pressurized hydraulic fluid when the IC engine is turned off. While conventional hydraulic control systems are effective, there is room in the art for improved hydraulic control circuits that reduce the amount of complex components while improving efficiency and controllability of the system during restart of the IC engine.

SUMMARY

A hydraulic control system for actuating at least one torque transmitting device in a powertrain is provided. The powertrain includes an engine and a transmission. The hydraulic control system includes a source of pressurized hydraulic fluid powered by the engine, an actuator for selectively actuating the at least one torque transmitting device, and a relay valve in communication with the actuator. The relay valve is moveable between a first position and a second position wherein the relay valve prevents communication between the source of pressurized hydraulic fluid and the actuator when in the first position and the regulator valve allows communication between the source of pressurized hydraulic fluid and the actuator when in the second position. An accumulator for storing and releasing the hydraulic fluid is in communication with the actuator and the source of pressurized hydraulic fluid. A first control device is disposed between the accumulator and the source of pressurized hydraulic fluid. The first control device has an open condition for allowing fluid communication between the accumulator and the source of pressurized hydraulic fluid and a closed condition for preventing fluid communication between the accumulator and the source of pressurized hydraulic fluid. A second control device is disposed between the accumulator and the actuator. The second control device has an open condition for allowing fluid communication between the accumulator and the actuator and a closed condition for preventing fluid communication between the accumulator and the actuator. The accumulator is charged with the hydraulic fluid when the engine is on and the first control device is open, the accumulator stores the hydraulic fluid when the first control device and the second control device are closed, and the accumulator releases the hydraulic fluid when the second control device is open and the relay valve is in the first position.

In another aspect of the present disclosure, the hydraulic system includes a regulator valve in communication with the relay valve and the source of pressurized hydraulic fluid, the regulator valve moveable between a first position and a second position wherein the regulator valve prevents communication between the source of pressurized hydraulic fluid and the relay valve when in the first position and wherein the regulator valve allows communication between the source of pressurized hydraulic fluid and the relay valve when in the second position.

In yet another aspect of the present disclosure, the first control device is a one way ball check valve that allows fluid communication from the source of pressurized hydraulic fluid to the accumulator and prevents fluid communication from the accumulator to the source of pressurized hydraulic fluid.

In yet another aspect of the present disclosure, the second control device is an on/off solenoid.

In yet another aspect of the present disclosure, the relay valve is moved to the second position by pressurized hydraulic fluid from the source of pressurized hydraulic fluid when the engine is on and wherein the relay valve is moved to the first position by a biasing member when the engine is off.

In yet another aspect of the present disclosure, a third control device is disposed in series relationship with the second control device, the accumulator, and the actuator, and the third control device includes an open condition for allowing fluid communication between the accumulator and the actuator and a closed condition for preventing fluid communication between the accumulator and the actuator.

In yet another aspect of the present disclosure, the third control device is an on/off solenoid.

In yet another aspect of the present disclosure, a fourth control device is disposed in series relationship with the actuator, the second control device, the first control device, and the accumulator, and the fourth control device includes an open condition for allowing fluid communication between the accumulator and the actuator and a closed condition for preventing fluid communication between the accumulator and the actuator.

In yet another aspect of the present disclosure, the fourth control device is a one way ball check valve that allows fluid communication from the accumulator to the actuator and prevents fluid communication from the actuator to the accumulator.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
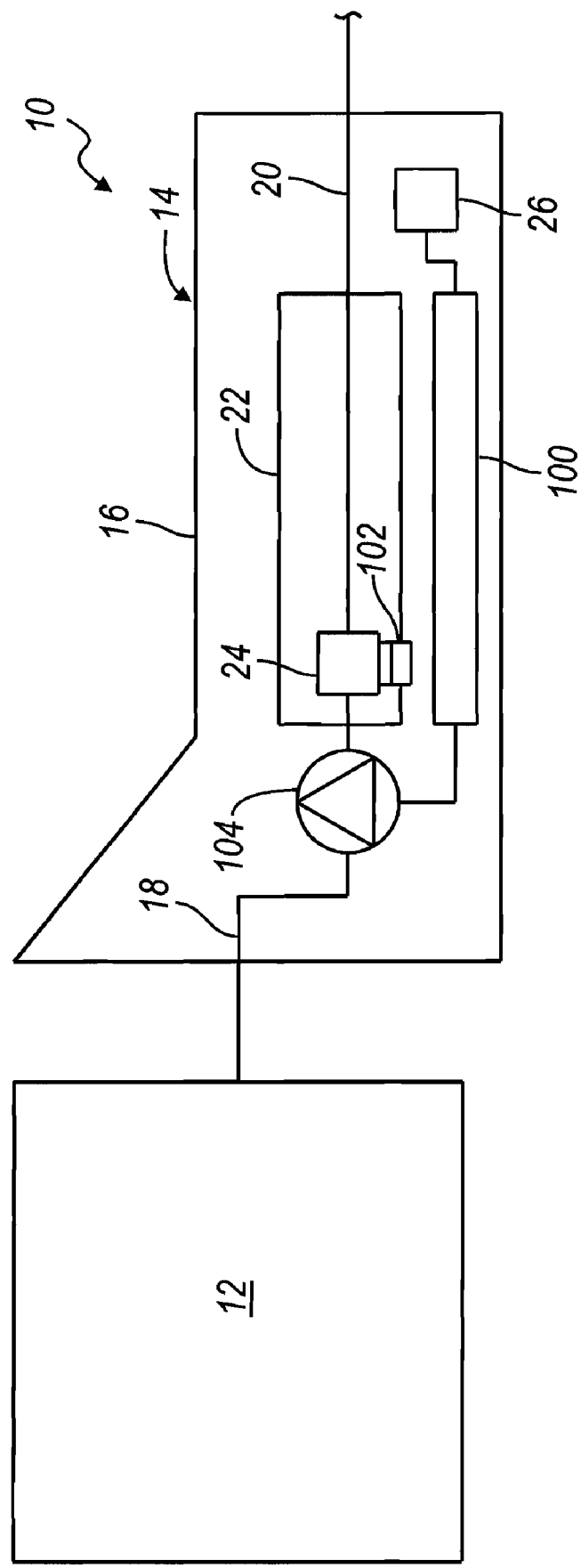
FIG. 1 is a schematic diagram of a powertrain having a hydraulic control system according to the principles of the present disclosure.

With reference to FIG. 1, an exemplary powertrain is generally indicated by reference number 10. The powertrain includes an engine 12 connected to a transmission 14. The engine 12 may be a conventional internal combustion engine or an electric engine, or any other type of prime mover, without departing from the scope of the present disclosure. In addition, additional components, such as hydrodynamic fluid driving devices such as torque converters and fluid couplings, may be disposed between the engine 12 and the transmission 14 without departing from the scope of the present disclosure. The engine 12 supplies a driving torque to the transmission 14.

The transmission 14 includes a typically cast, metal housing 16 which encloses and protects the various components of the transmission 14. The housing 16 includes a variety of apertures, passageways, shoulders and flanges which position and support these components. The transmission 14 includes an input shaft 18, an output shaft 20, and a gear and clutch arrangement 22. It should be appreciated that while the transmission 14 is illustrated as a rear wheel drive transmission, the transmission 14 may have other configurations without departing from the scope of the present disclosure. The input shaft 18 is connected with the engine 12 and receives input torque or power from the engine 12. The output shaft 20 is preferably connected with a final drive unit (not shown) which may include, for example, propshafts, differential assemblies, and drive axles. The input shaft 18 is coupled to and provides drive torque to the gear and clutch arrangement 22.

The gear and clutch arrangement 22 includes a plurality of gear sets and a plurality of shafts, neither of which is shown in detail. The plurality of gear sets may include individual inter-meshing gears, such as planetary gear sets, that are connected to or selectively connectable to the plurality of shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission 14 may vary without departing from the scope of the present disclosure.

The gear and clutch arrangement 22 further includes at least one torque transmitting mechanism 24. In the example provided, the torque transmitting mechanism 24 is engageable to initiate a first gear or speed ratio by selectively coupling individual gears within the plurality of gear sets to the plurality of shafts. Accordingly, the torque transmitting mechanism 24 may be any type of clutch, including wet clutches, rotating clutches, etc., without departing from the scope of the present disclosure.

The transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the torque transmitting mechanism 24 via a hydraulic control system 100 according to the principles of the present disclosure.

The hydraulic control system 100 is operable to selectively engage the torque transmitting device 24 by selectively communicating a hydraulic fluid to a shift actuating device 102 that engages the torque transmitting device 24, as will be described in greater detail below. The shift actuating device 102 may be a piston assembly or any other hydraulically actuatable mechanism without departing from the scope of the present disclosure. The hydraulic fluid is communicated to the shift actuating device 102 under pressure from a pump 104 that is driven by the engine 12. Accordingly, the pump 102 is operable when the engine 12 is on or running and the pump 102 is inoperable when the engine 12 is off or not running. The pump 104 may be of various types, for example, a gear pump, a vane pump, a gerotor pump, or any other positive displacement pump.

Figure 2A:
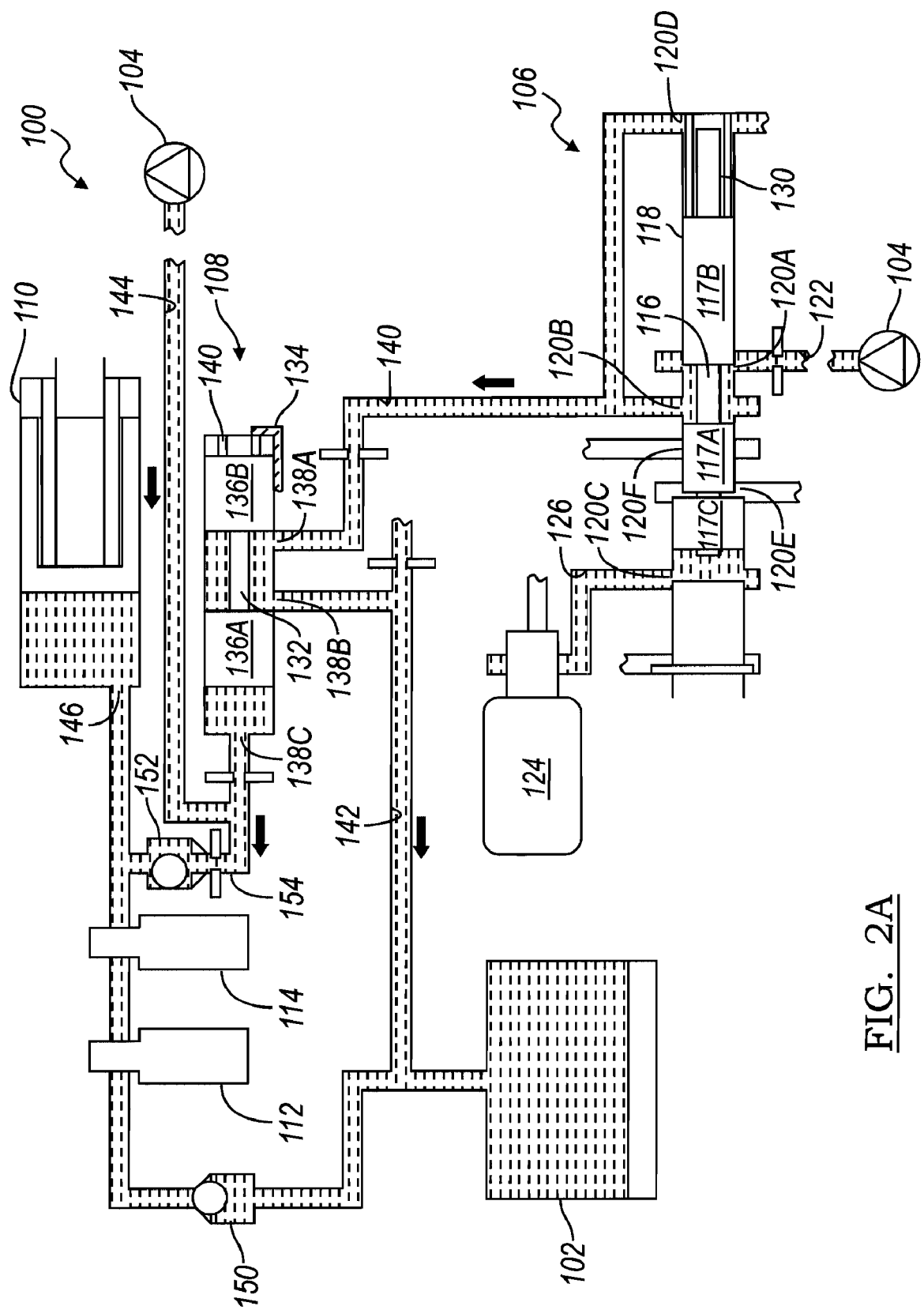
FIG. 2A is a diagram of an example of a hydraulic control system according to the principles of the present disclosure in an "engine on" mode of operation.
Figure 2B:
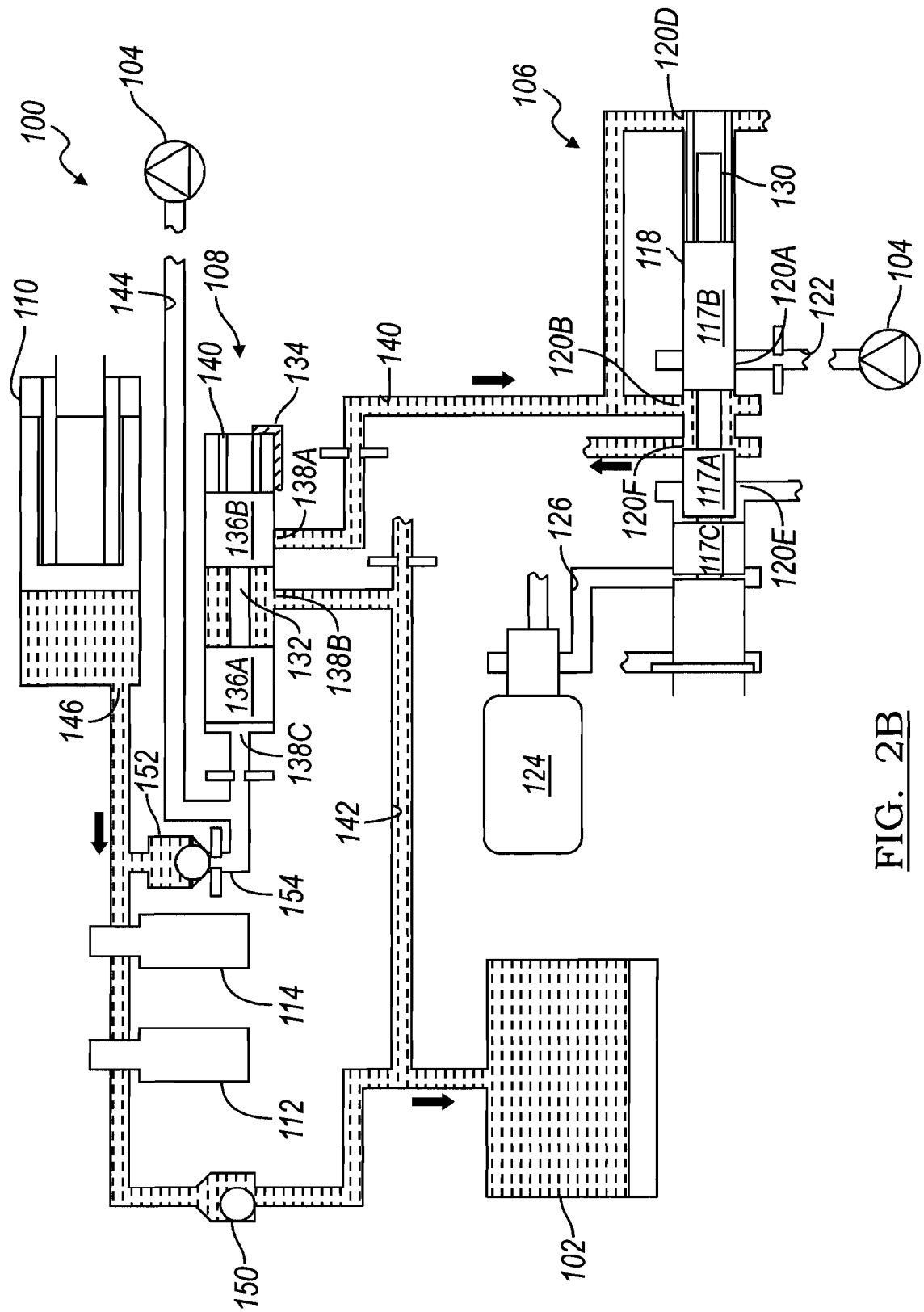
FIG. 2B is a diagram of the hydraulic control system of FIG. 2A in an "engine restart" mode of operation.

Turning to FIGS. 2A and 2B, a portion of the hydraulic control system 100 is illustrated in more detail. It should be appreciated that while the actuator subsystem for the torque transmitting device 24 is shown, the hydraulic control system 100 may include various other subsystems, such as other actuator subsystems for other torque transmitting devices, a torque converter clutch (TCC) subsystem, a line pressure control subsystem, a cooling subsystem, etc., without departing from the scope of the present disclosure. The hydraulic control system 100 includes a clutch regulator valve 106, a relay valve 108, an accumulator 110, a first solenoid 112, and a second solenoid 114.

The clutch regulator valve 106 includes a valve 116 slidably disposed in a valve body 118. The valve 116 is a spool valve having a plurality of lands 117A, 117B, and 117C. A plurality of ports are disposed in the valve body 118 and communicate with the valve 116. For example, the clutch regulator valve 106 includes an inlet port 120A, an outlet port 120B, an actuation port 120C, and a plurality of exhaust ports 120E, and 120F, and a feedback port 120D. It should be appreciated that the clutch regulator valve 106 may have various other ports and configurations without departing from the scope of the present disclosure. The inlet port 120A is in fluid communication with the pump 104 via a main supply line 122.

The valve 116 is moveable between at least two positions including a first position, shown in FIG. 2B, and a second position, shown in FIG. 2A. When the valve 116 is in the first position, the land 117B prevents the inlet port 120A from communicating with the outlet port 120B. When the valve 116 is in the second position, as illustrated in FIG. 2A, the inlet port 120A communicates with the outlet port 120B. The valve 116 is actuated by an actuator solenoid 124, such as a variable bleed solenoid, that selectively communicates a pressurized hydraulic fluid to the solenoid actuation port 120C via an actuator fluid line 126. The actuator fluid line 126 may be formed from channels integrated in a valve body or from separate tubing, piping, or any other means without departing from the scope of the present disclosure. The hydraulic fluid supplied by the actuator solenoid 124 contacts land 117C that moves the valve 116 to the second position. A biasing member 130 disposed on an opposite side of the valve 116 urges the valve 116 to the first position.

The relay valve 108 includes a valve 132 slidably disposed in a valve body 134. The valve 132 is a spool valve having a plurality of lands 136A and 136B. A plurality of ports are disposed in the valve body 134 and communicate with the valve 132. For example, the relay valve 108 includes an inlet port 138A, an outlet port 138B, and an actuation port 138C. It should be appreciated that the relay valve 108 may have various other ports and configurations without departing from the scope of the present disclosure. The inlet port 138A is in communication with the outlet port 120B of the clutch regulator valve 106 via a fluid communication line 140. The outlet port 138B is in communication with the shift actuating device 102 and with the accumulator 110 via a fluid communication line 142. The actuation port 138C is in communication with the pump 104 via a fluid communication line 144.

The valve 132 is moveable between at least two positions including a first position, shown in FIG. 2B, and a second position, shown in FIG. 2A. When the valve 132 is in the first position, the land 136B prevents the inlet port 138A from communicating with the outlet port 138B. When the valve 132 is in the second position the inlet port 138A communicates with the outlet port 138B. The valve 132 is actuated by hydraulic fluid supplied by pump 104 that is communicated to the actuation port 138C via the fluid communication line 144. The hydraulic fluid supplied by the pump 104 contacts the valve 132 and moves the valve 132 to the second position. A biasing member 140 disposed on an opposite side of the valve 132 urges the valve 132 to the first position.

The accumulator 110 is an energy storage device in which the non-compressible hydraulic fluid is held under pressure by an external source. In the example provided, the accumulator 110 is a spring type or gas filled type accumulator having a spring or compressible gas that provides a compressive force on the hydraulic fluid within the accumulator 110. However, it should be appreciated that the hydraulic accumulator 110 may be of other types without departing from the scope of the present invention. The accumulator 110 includes an inlet/outlet port 146 that allows the hydraulic fluid to communicate in and out of the accumulator 110. The inlet/outlet port 146 is in communication with the fluid communication line 144.

The first solenoid 112 is disposed within the fluid communication line 142 between the accumulator 110 and the shift actuating device 102 and the relay valve 108. The first solenoid 112 is preferably a high flow, on-off solenoid that is normally closed. However, it should be appreciated that other types of solenoids and other control devices may be employed without departing from the scope of the present disclosure.

The second solenoid 114 is disposed within the fluid communication line 142 between the accumulator 110 and the first solenoid 112. The second solenoid 114 is preferably a high flow, on-off solenoid that is normally closed. However, it should be appreciated that other types of solenoids and other control devices may be employed without departing from the scope of the present disclosure. The solenoids 112 and 114 act as redundant failsafes to each other in case one or the other of the solenoids 112 and 114 fails.

A first ball check valve 150 is located within the fluid communication line 142 between the first solenoid 112 and the shift actuating device 102 and the relay valve 108. The ball check valve 150 allows for fluid communication in one direction only. In the example provided, the ball check valve 150 allows for fluid communication from the accumulator 110 to the shift actuating device 102. It should be appreciated that other types of one way valves or other control devices may be employed in the location of the ball check valve 150 without departing from the scope of the present disclosure.

A second ball check valve 152 is located within a fluid communication line 154 that is connected to the fluid communication line 142 and the fluid communication line 144. The line 154 connects with line 142 between the second solenoid 114 and the accumulator 110. The ball check valve 152 allows for fluid communication in one direction only. In the example provided, the ball check valve 152 allows for fluid communication from the pump 104 to the accumulator 110. It should be appreciated that other types of one way valves or other control devices may be employed in the location of the ball check valve 152 without departing from the scope of the present disclosure.

It should be appreciated that the plurality of fluid communication lines described above may be integrated in a valve body or formed from separate tubing or piping without departing from the scope of the present disclosure. In addition, the fluid communication lines may have any cross sectional shape and may include additional or fewer bends, turns, and branches than illustrated without departing from the scope of the present disclosure.

The operation of the hydraulic control system 100 will now be described. The hydraulic control system 100 operates in at least two modes: a first mode, shown in FIG. 2A, wherein the engine 12 is on thereby operating the pump 104 and charging the accumulator 110, and a second mode, shown in FIG. 2B, wherein the engine 12 is off or restarting and the main pump 104 is not operating or operating at a condition that provides low pressure and the accumulator 110 is discharging in order to actuate the torque transmitting device 24.

With reference to FIG. 2A, during the first mode of operation when the pump 104 is operational, the pump 104 provides pressurized hydraulic fluid through lines 122 and 144. The hydraulic fluid from line 144 contacts the valve 132 in the relay valve 108 and moves the relay valve 108 to the second position. Also, an electric signal from the controller 26 activates the actuator solenoid 124 thereby sending pressurized hydraulic fluid via line 126 to engage the land 117C and move the valve 116 to the second position. Accordingly, pressurized hydraulic fluid communicates through the inlet port 120A to outlet port 120B, through line 140 to inlet port 138A, from inlet port 138A to outlet port 138B, and through line 142 to the shift actuating device 102. The accumulator 110 is charged by closing the first and second solenoids 112 and 114. Pressurized hydraulic fluid communicates from line 144 to line 154, through the ball check valve 152 to the accumulator 110. The ball check valve 152 prevents the hydraulic fluid from exiting the accumulator 110. Keeping the solenoids 112, 114 closed in turn keeps the accumulator 110 energized.

With reference to FIG. 2B, when the motor vehicle stops (i.e., at a red light for example), the engine shuts off and the main pump 104 stops rotating, so there is no pressure in the hydraulic circuit providing oil to the torque transmitting device 24. To start the motor vehicle without delay, the hydraulic circuit must be filled with pressurized hydraulic fluid. Accordingly, during engine restart, lines 122 and 144 are not supplied with pressurized hydraulic fluid immediately. Therefore, the valve 132 is moved by the biasing member 140 to the first position thereby preventing line 142 from communicating with line 140 and therefore the regulator valve 106. Also, hydraulic fluid to the actuator solenoid 124 is not provided and accordingly the valve 116 is moved to the first position by the biasing member 130. In order to pressurize the shift actuating device 102 to provide limited delay to initiate first gear, the controller 26 opens the solenoids 112 and 114. Accordingly, the accumulator 110 discharges and provides pressurized hydraulic fluid to the shift actuating device 102 via line 142. The relay valve 108 prevents the pressurized hydraulic fluid from filling the regulator valve 106 and venting, thereby maintaining pressure to the shift actuating device 102 until such time as the pump 104 is fully operational and providing full line pressure to the hydraulic control system 100.

Figure 2C:
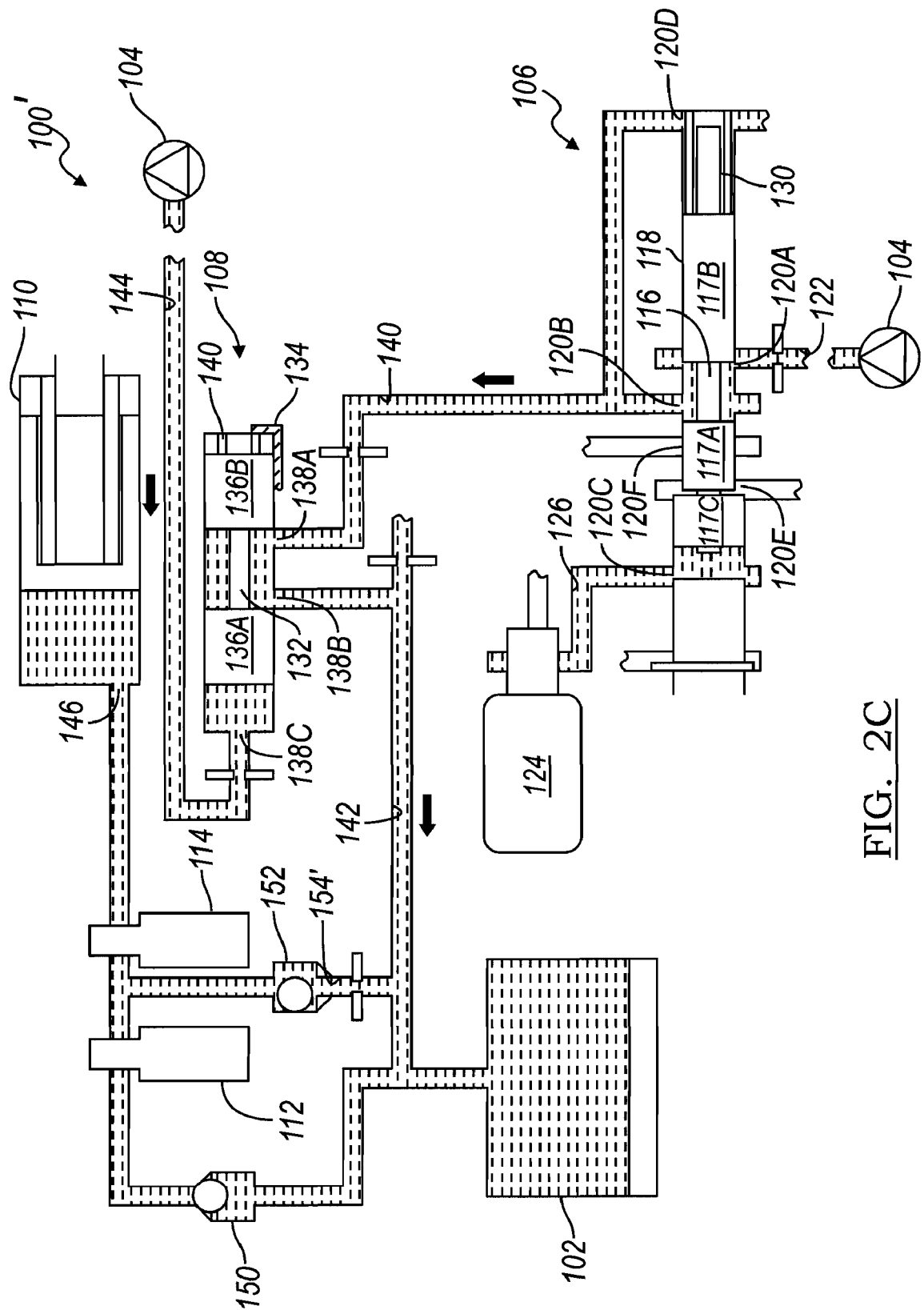
FIG. 2C is a diagram of an alternative embodiment of the hydraulic control system of FIGS. 2A and 2B.

Turning to FIG. 2C, an alternate embodiment of the hydraulic control system 100 is generally indicated by reference number 100'. The hydraulic control system 100' is substantially similar to the hydraulic control system 100 and like components are indicated by like reference numbers. However, in the hydraulic control system 100', fluid communication line 154 is replaced with fluid communication line 154'. Line 154' is connected to fluid communication line 142 between the first solenoid 112 and the second solenoid 114 and is connected to line 142 between the ball check valve 150 and the relay valve 108. Accordingly, in order to charge the accumulator 110, the second solenoid 114 is commanded by the controller 26 to open.

Figure 3A:
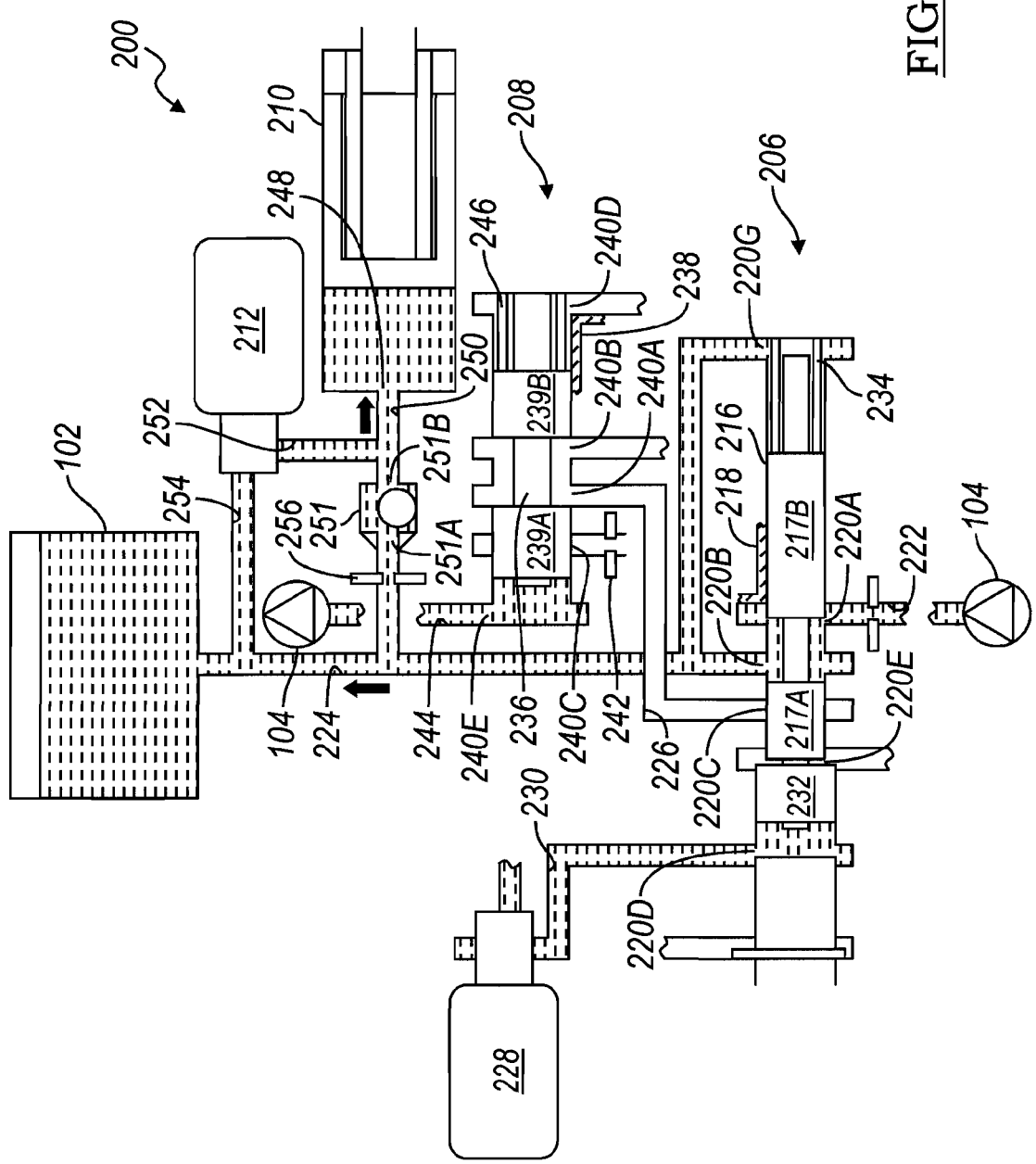
FIG. 3A is a diagram of another example of a hydraulic control system according to the principles of the present disclosure in an "engine on" mode of operation.
Figure 3B:
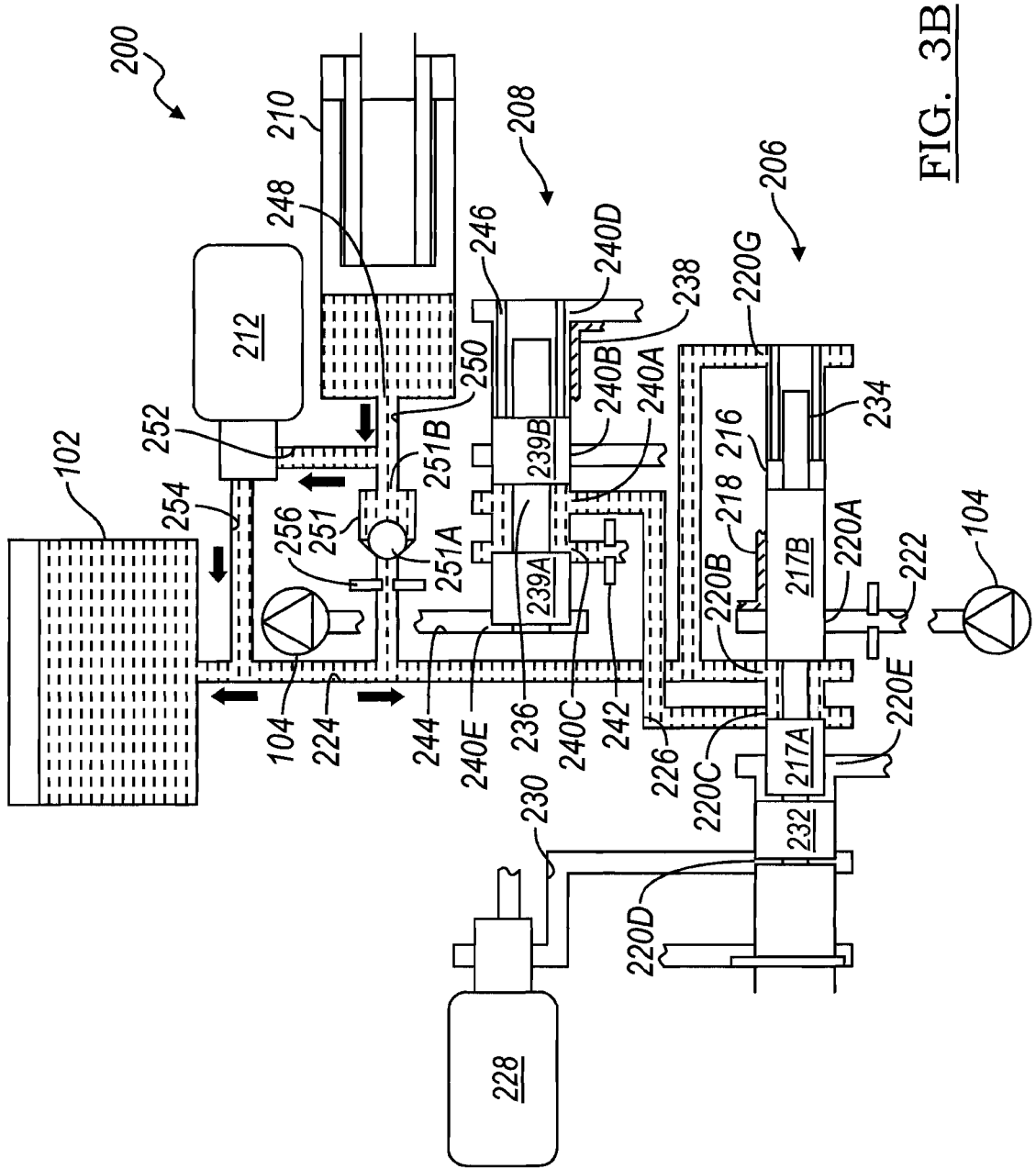
FIG. 3B is a diagram of the hydraulic control system of FIG. 3A in an "engine restart" mode of operation.
Figure 3C:
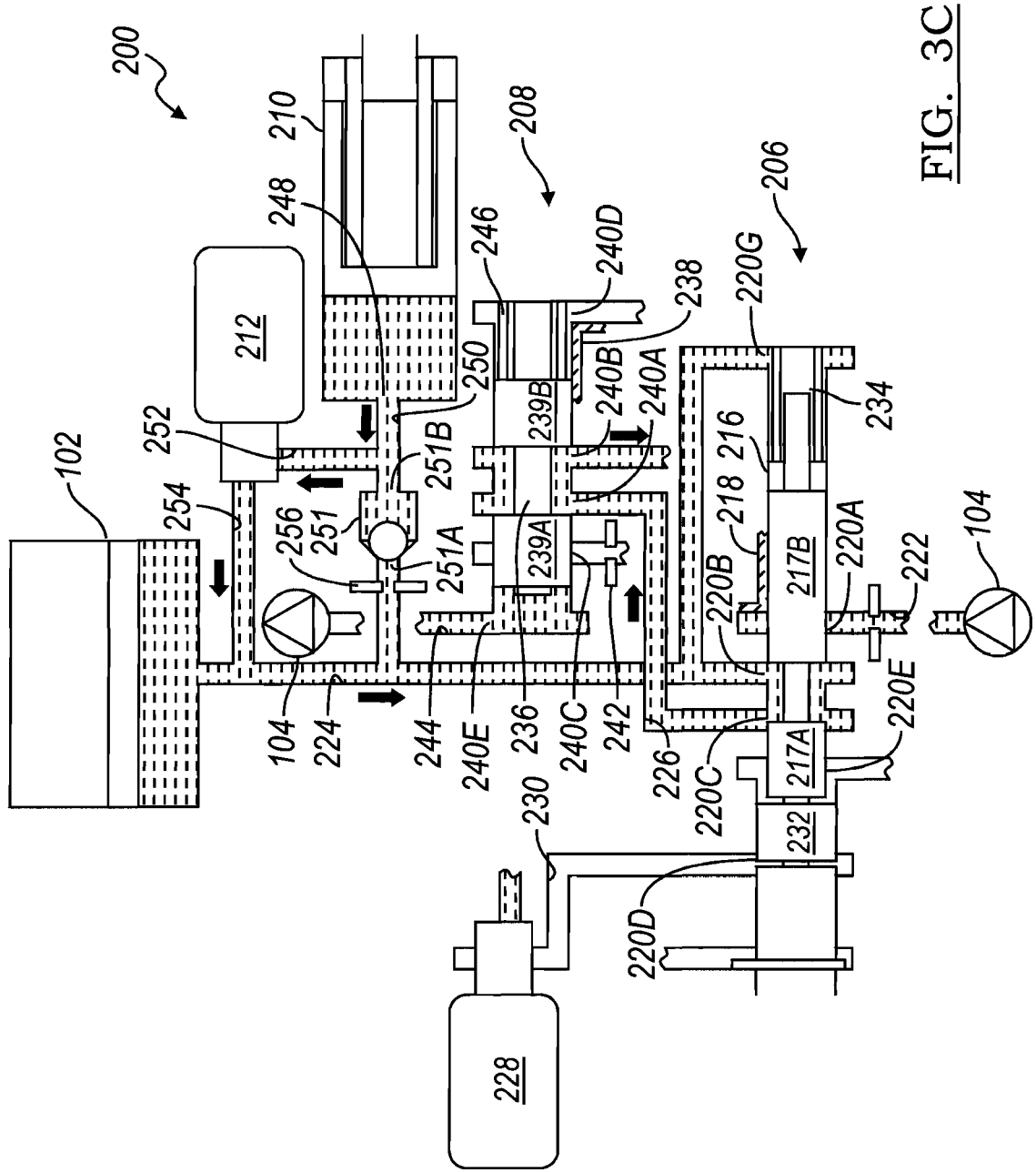
FIG. 3C is a diagram of the hydraulic control system of FIG. 3A in "drive to neutral" mode of operation.

With reference to FIGS. 3A-C, an alternate embodiment of a hydraulic control system is generally indicated by reference number 200. The hydraulic control system 200 includes a clutch regulator valve 206, a relay valve 208, an accumulator 210, and a solenoid 212.

The clutch regulator valve 206 includes a valve 216 slidably disposed in a valve body 218. The valve 216 is a spool valve having a plurality of lands 217A and 217B. A plurality of ports are disposed in the valve body 218 and communicate with the valve 216. For example, the clutch regulator valve 206 includes an inlet port 220A, a first outlet port 220B, a second outlet port 220C, an actuation port 220D, an exhaust port 220E, and a feedback port 220G. It should be appreciated that the clutch regulator valve 206 may have various other ports and configurations without departing from the scope of the present disclosure. The inlet port 220A is in fluid communication with the pump 104 via a main supply line 222. The first outlet port 220B is in fluid communication with the accumulator 110 via a fluid communication line 224. The second outlet port 220C is in fluid communication with the relay valve 208 via a fluid communication line 226. The feedback port 220G is in fluid communication with the line 224.

The valve 216 is moveable between at least two positions including a first position, shown in FIG. 3B, and a second position, shown in FIG. 2A. When the valve 216 is in the first position, the first outlet port 220B is in communication with the second outlet port 220C and the land 217B prevents the inlet port 220A from communicating with the first outlet port 220B and the second outlet port 220C. When the valve 216 is in the second position, as illustrated in FIG. 2A, the inlet port 220A is in communication with the first outlet port 220B and the land 217A prevents communication between the inlet port 220A and the second outlet port 220C. The valve 216 is actuated by an actuator solenoid 228, such as a variable bleed solenoid, that selectively communicates a pressurized hydraulic fluid to the solenoid actuation port 220D via an actuator fluid line 230. The actuator fluid line 230 may be formed from channels integrated in a valve body or from separate tubing, piping, or any other means without departing from the scope of the present disclosure. The hydraulic fluid supplied by the actuator solenoid 228 contacts a signal land 232 that pushes the valve 216 to the second position. A biasing member 234 disposed on an opposite side of the valve 216 urges the valve 216 to the first position.

The relay valve 208 includes a valve 236 slidably disposed in a valve body 238. The valve 236 is a spool valve having a plurality of lands 239A and 239B. A plurality of ports are disposed in the valve body 238 and communicate with the valve 236. For example, the relay valve 208 includes an inlet port 240A, exhaust ports 240B, 240C and 240D, and actuation port 240E. It should be appreciated that the relay valve 208 may have various other ports and configurations without departing from the scope of the present disclosure. The inlet port 240A is in communication with the second outlet port 220C of the clutch regulator valve 206 via the fluid communication line 226. The exhaust port 240C is in communication with an orifice 242 to reduce exhaust flow. The actuation port 240E is in communication with the pump 104 via a fluid communication line 244.

The valve 236 is moveable between at least two positions including a first position, shown in FIG. 3B, and a second position, shown in FIG. 3A. When the valve 236 is in the first position, the inlet port 240A is in communication with the exhaust port 240C and the land 239B prevents the inlet port 240A from communicating with the exhaust port 240B. When the valve 236 is in the second position the inlet port 240A communicates with the exhaust port 240B and the land 239A prevents the inlet port 240A from communicating with the exhaust port 240C. The valve 236 is actuated by hydraulic fluid supplied by pump 104 that is communicated to the actuation port 240E via the fluid communication line 244. The hydraulic fluid supplied by the pump 104 contacts the valve 236 and moves the valve 236 to the second position. A biasing member 246 disposed on an opposite side of the valve 236 urges the valve 236 to the first position.

The accumulator 210 is an energy storage device in which the non-compressible hydraulic fluid is held under pressure by an external source. In the example provided, the accumulator 210 is a spring type or gas filled type accumulator having a spring or compressible gas that provides a compressive force on the hydraulic fluid within the accumulator 210. However, it should be appreciated that the hydraulic accumulator 210 may be of other types, such as a gas-charged type, without departing from the scope of the present invention. The accumulator 210 includes an inlet/outlet port 248 that allows the hydraulic fluid to communicate in and out of the accumulator 210. The inlet/outlet port 248 is in communication with a fluid communication line 250. The fluid communication line 250 is connected to a ball check valve 251 and a fluid communication line 252.

The ball check valve 251 includes a port 251A in communication with line 224 and a port 251B in communication with line 250. The ball check valve 251 allows for fluid communication in one direction only. In the example provided, the ball check valve 251 allows for fluid communication from port 251A to port 251B. It should be appreciated that other types of one way valves or other control devices may be employed in the location of the ball check valve 251 without departing from the scope of the present disclosure.

The solenoid 212 is disposed between the fluid communication line 252 and a fluid communication line 254. Line 252 is connected to line 250. Line 254 is connected with line 224. The solenoid 212 is preferably a high flow, on-off solenoid that is normally closed. However, it should be appreciated that other types of solenoids or other control devices may be employed without departing from the scope of the present disclosure. The solenoid 212 allows for hydraulic fluid to communicate between lines 252 and 254.

It should be appreciated that the plurality of fluid communication lines described above may be integrated in a valve body or formed from separate tubing or piping without departing from the scope of the present disclosure. In addition, the fluid communication lines may have any cross sectional shape and may include additional or fewer bends, turns, and branches than illustrated without departing from the scope of the present disclosure.

The operation of the hydraulic control system 200 will now be described. The hydraulic control system 200 operates in at least two modes: a first mode, shown in FIG. 3A, wherein the engine 12 is on thereby operating the pump 104 and charging the accumulator 210, and a second mode, shown in FIG. 3B, wherein the engine 12 is off or restarting and the main pump 104 is not operating or operating at a low speed and the accumulator 210 is discharging.

With reference to FIG. 3A, during the first mode of operation when the pump 104 is operational, the pump 104 provides pressurized hydraulic fluid through lines 222 and 244. The hydraulic fluid from line 244 contacts the valve 236 in the relay valve 208 and moves the relay valve 208 to the second position. Also, an electric signal from the controller 26 activates the actuator solenoid 228 thereby sending pressurized hydraulic fluid via line 230 to engage the signal land 232 and move the valve 216 to the second position. Accordingly, pressurized hydraulic fluid communicates through the inlet port 220A to outlet port 220B, through line 224 to the shift actuating device 102. The accumulator 110 is charged by closing the solenoid 212. Pressurized hydraulic fluid communicates from line 224, through an orifice 256, through the ball check valve 251 to the accumulator 210. The ball check valve 251 prevents the hydraulic fluid from exiting the accumulator 210. Keeping the solenoid 212 closed in turn keeps the accumulator 210 energized.

With reference to FIG. 3B, when the motor vehicle stops (i.e., at a red light for example), the engine shuts off and the main pump 104 stops rotating, so there is no pressure in the hydraulic circuit providing oil to the torque transmitting device 24. To start the motor vehicle without delay, the hydraulic circuit must be filled with pressurized hydraulic fluid. Accordingly, during engine restart, lines 222 and 244 are not supplied with pressurized hydraulic fluid immediately. Also, hydraulic fluid to the actuator solenoid 228 is not provided and accordingly the valve 216 is moved to the first position by the biasing member 234. In addition, the valve 236 is moved by the biasing member 246 to the first position thereby allowing the inlet port 240A to communicate with the exhaust port 240C. Exhaust port 240C exhausts through the orifice 242, thereby reducing pressure loss when the accumulator 210 is discharged. In order to pressurize the shift actuating device 102 to provide limited delay to initiate first gear, the controller 26 opens the solenoid 212. Accordingly, the accumulator 210 discharges and provides pressurized hydraulic fluid to the shift actuating device 102 via lines 254 and 224.

Turning to FIG. 3C, in the event that the transmission 14 is selected from drive to neutral while the engine is running and the accumulator is in an energized state, as the main line pressure increases from the pump 104, pressurized hydraulic fluid contacts the valve 236 and moves the valve 236 to the second position. Meanwhile, the valve 216 is maintained in the first position. The controller 26 then opens the solenoid 212 and hydraulic fluid is allowed to exhaust quickly through lines 254, 224, through the regulator valve 206, through line 226, and out the exhaust port 240B. Since no orifice limits exhaust port 240B, the accumulator 210 discharges quickly and thereby assures that the shift actuating device 102 is not unintentionally engaged while the transmission 14 is in a neutral state.

Figure 3D:
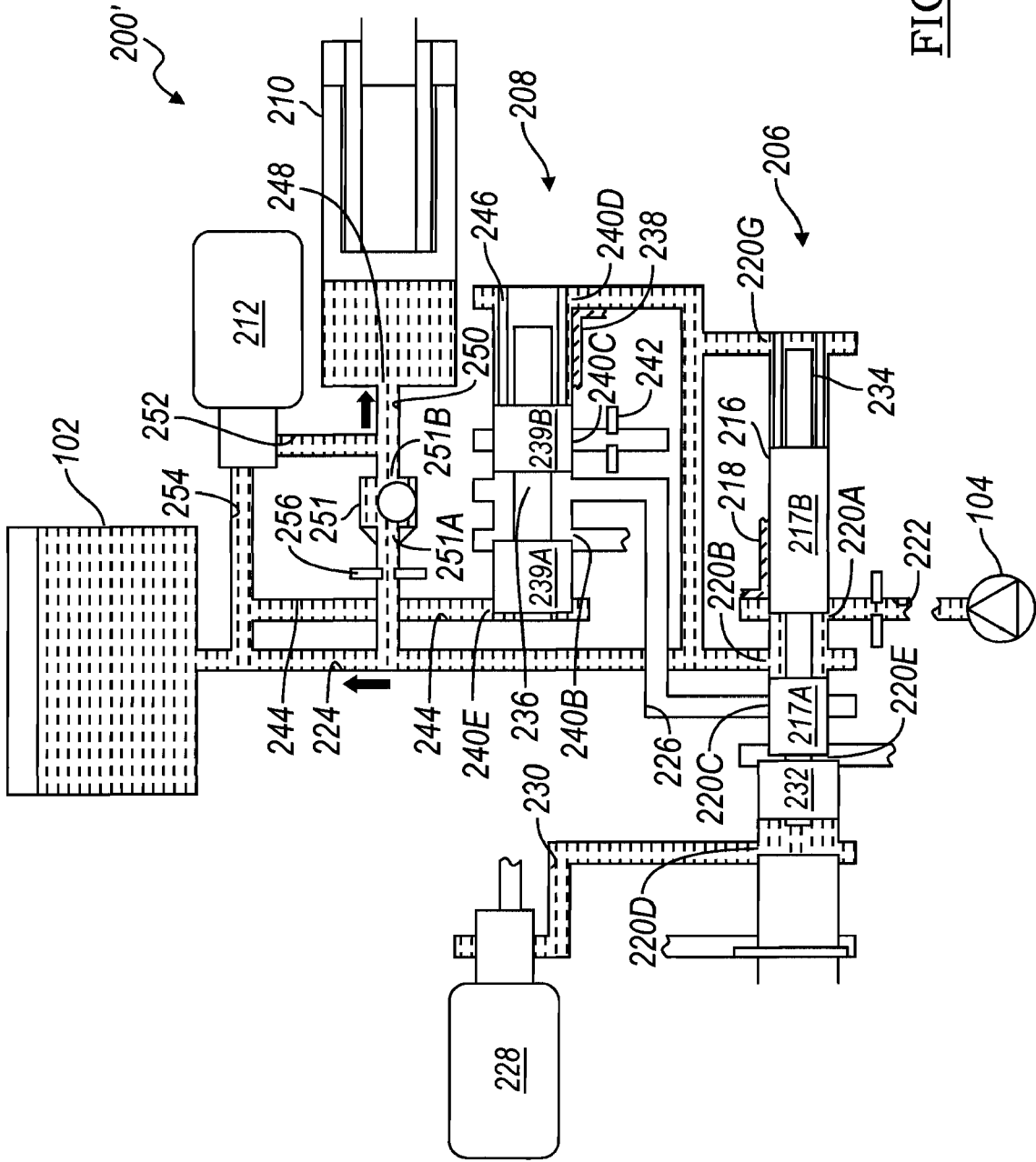
FIG. 3D is a diagram of an alternative embodiment of the hydraulic control system of FIGS. 3A, 3B, and 3C.

With reference to FIG. 3D, an alternate embodiment of the hydraulic control system 200 is generally indicated by reference number 200'. The hydraulic control system 200' is substantially similar to the hydraulic control system 200 and like components are indicated by like reference numbers. However, in the hydraulic control system 200', fluid communication line 244 is connected with fluid communication line 254 and ports 240C and 240B of the relay valve 208 are switched in position in relation to the valve 236. Accordingly, the valve 236 moves to the second position when the accumulator 210 is discharged and when the pump 104 is engaged.

Figure 4A:
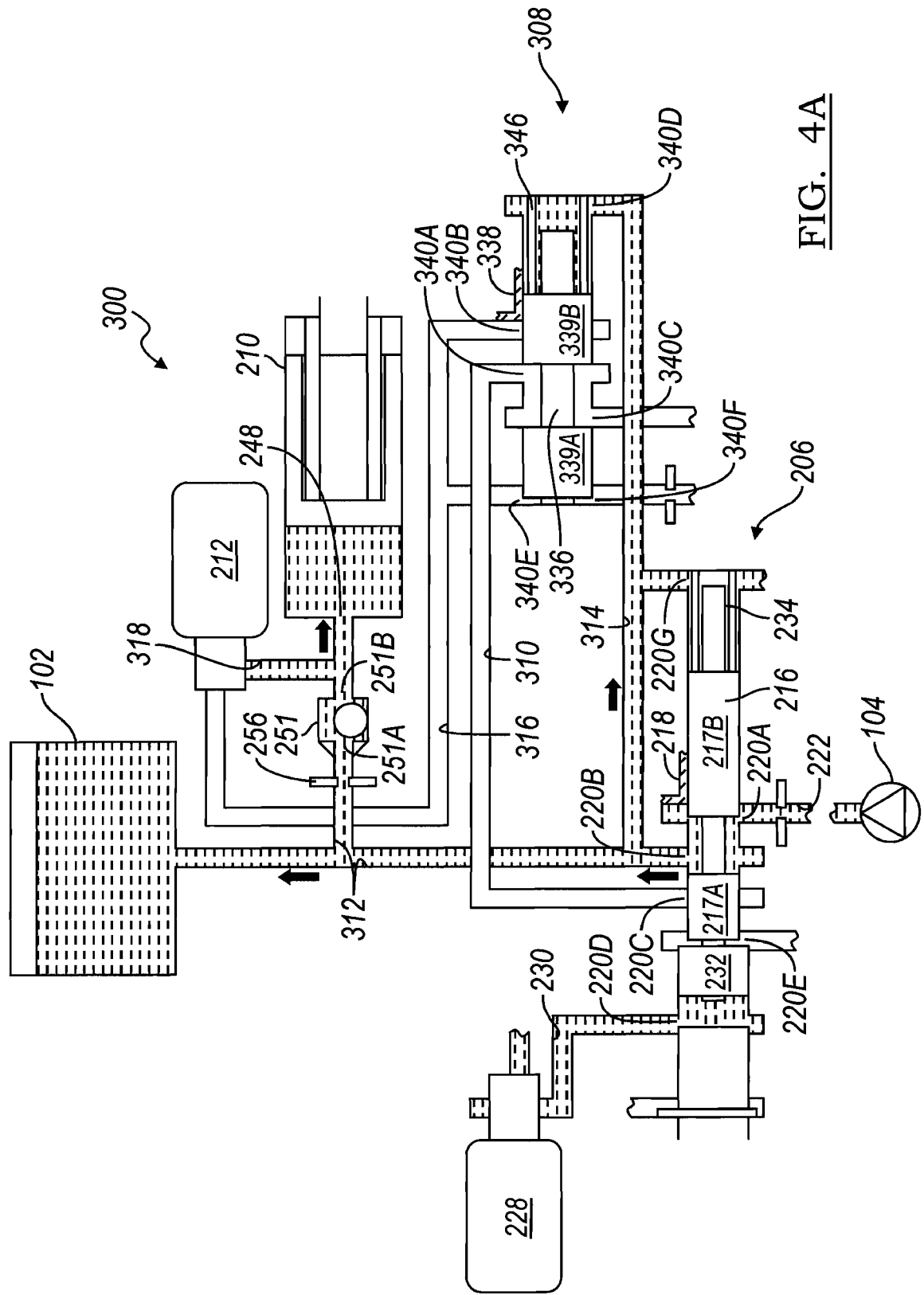
FIG. 4A is a diagram of an example of a hydraulic control system according to the principles of the present disclosure in an "engine on" mode of operation.
Figure 4B:
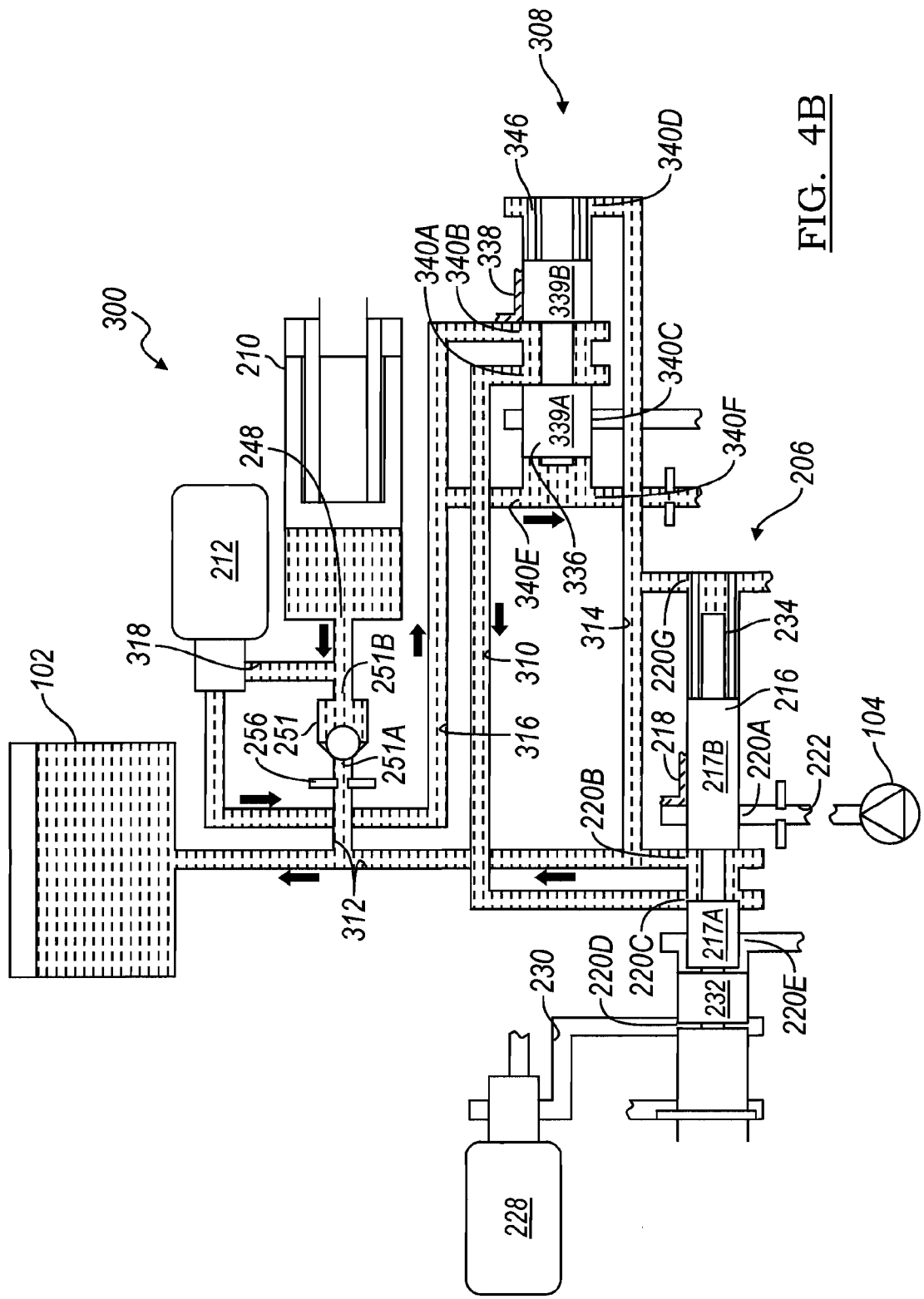
FIG. 4B is a diagram of the hydraulic control system of FIG. 4A in an "engine restart" mode of operation.

Turning now to FIGS. 4A and 4B, an alternate embodiment of a hydraulic control system is generally indicated by reference number 300. The hydraulic control system 300 includes the clutch regulator valve 206, the accumulator 210, the solenoid 212, and the ball check valve 251 previously described with regards to FIGS. 3A-D. However, the hydraulic control system 300 includes a relay valve 308 that is different from the relay valve 208 described previously. In addition, the components of the hydraulic control system 300 are connected in a different manner than the hydraulic control system 200, as will be described below.

The relay valve 308 includes a valve 336 slidably disposed in a valve body 338. The valve 336 is a spool valve having a plurality of lands 339A and 339B. A plurality of ports are disposed in the valve body 338 and communicate with the valve 336. For example, the relay valve 308 includes an outlet port 340A, an inlet port 340B, feedback ports 340D and 340E, and exhaust ports 340C and 340F. It should be appreciated that the relay valve 308 may have various other ports and configurations without departing from the scope of the present disclosure.

The valve 336 is moveable between at least two positions including a first position, shown in FIG. 4A, and a second position, shown in FIG. 4B. When the valve 336 is in the first position, the port 340A is in communication with the exhaust port 340C and the land 339B prevents the port 340A from communicating with the port 340B. When the valve 336 is in the second position the port 340A communicates with the port 340B and the land 339A prevents the port 340A from communicating with the port 340C. The valve 336 is actuated by hydraulic fluid supplied by the accumulator 210 that is communicated to the actuation port 340E. The hydraulic fluid supplied by the accumulator 210 contacts the valve 336 and moves the valve 336 to the second position. A biasing member 346 disposed on an opposite side of the valve 336 urges the valve 336 to the first position. Additionally, the valve 336 is actuated by hydraulic fluid connected to the shift actuating device 102 that is communicated to the actuation port 340D.

The components of the hydraulic control system 300 are connected via a plurality of fluid communication lines. It should be appreciated that the fluid communication lines may be integrated in a valve body or formed from separate tubing or piping without departing from the scope of the present disclosure. In addition, the fluid communication lines may have any cross sectional shape and may include additional or fewer bends, turns, and branches than illustrated without departing from the scope of the present disclosure. In the example provided, a fluid communication line 310 connects the fluid port 220C of the regulator valve 206 with the port 340A of the relay valve 308. A fluid communication line 312 connects the fluid port 220B of the regulator valve 206 with the shift actuating device 102 and with the ball check valve 251. A fluid communication line 314 connects port 220G with the fluid communication line 312 and with the port 340D of the relay valve 308. A fluid communication line 316 connects the solenoid 212 with the fluid ports 340E and 340B of the relay valve 308. A fluid communication line 318 connects the inlet/outlet port 248 of the accumulator 210 with the solenoid 212 and with the ball check valve 251.

The operation of the hydraulic control system 300 will now be described. The hydraulic control system 300 operates in at least two modes: a first mode, shown in FIG. 4A, wherein the engine 12 is on thereby operating the pump 104 and charging the accumulator 210, and a second mode, shown in FIG. 4B, wherein the engine 12 is off or restarting and the main pump 104 is not operating or operating at a reduced capacity and the accumulator 210 is discharging.

With reference to FIG. 4A, during the first mode of operation when the pump 104 is operational, the pump 104 provides pressurized hydraulic fluid through line 222 and an electric signal from the controller 26 activates the actuator solenoid 228 thereby sending pressurized hydraulic fluid via line 230 to engage the signal land 232 and move the valve 216 to the second position. The hydraulic fluid from line 222 is communicated through the regulator valve 206 to line 312 where the hydraulic fluid is delivered to the shift actuating device 102. In addition, the hydraulic fluid is communicated to line 314. The hydraulic fluid from line 314 contacts the valve 336 in the relay valve 308 and, along with the biasing member 346, moves the relay valve 308 to the first position. Hydraulic fluid in line 312 also communicates through the orifice 256, through the ball check valve 251, and through the line 318 to the accumulator 210. The accumulator 110 is charged by closing the solenoid 212 and the ball check valve 251 prevents the hydraulic fluid from exiting the accumulator 210. Keeping the solenoid 212 closed in turn keeps the accumulator 210 energized.

With reference to FIG. 4B, when the motor vehicle stops (i.e., at a red light for example), the engine shuts off and the main pump 104 stops rotating, so there is no pressure in the hydraulic circuit providing oil to the torque transmitting device 24. To start the motor vehicle without delay, the hydraulic circuit must be filled with pressurized hydraulic fluid. Accordingly, during engine restart, line 222 is not supplied with pressurized hydraulic fluid immediately. Also, hydraulic fluid to the actuator solenoid 228 is not provided and accordingly the valve 216 is moved to the first position by the biasing member 234. To discharge the accumulator 210, the solenoid 212 is opened. Pressurized hydraulic fluid is communicated through line 318, through the solenoid 212, through line 316 where the hydraulic fluid contacts the valve 336 of the relay valve 308. Accordingly, the valve 336 moves to the second position thereby allowing port 340B to communicate with port 340A. Hydraulic fluid therefore communicates from line 316, through the relay valve 308, and into line 310. The hydraulic fluid then communicates through the regulator valve 206 and into line 312 which feeds the hydraulic fluid to the shift actuating device 102.

Figure 5A:
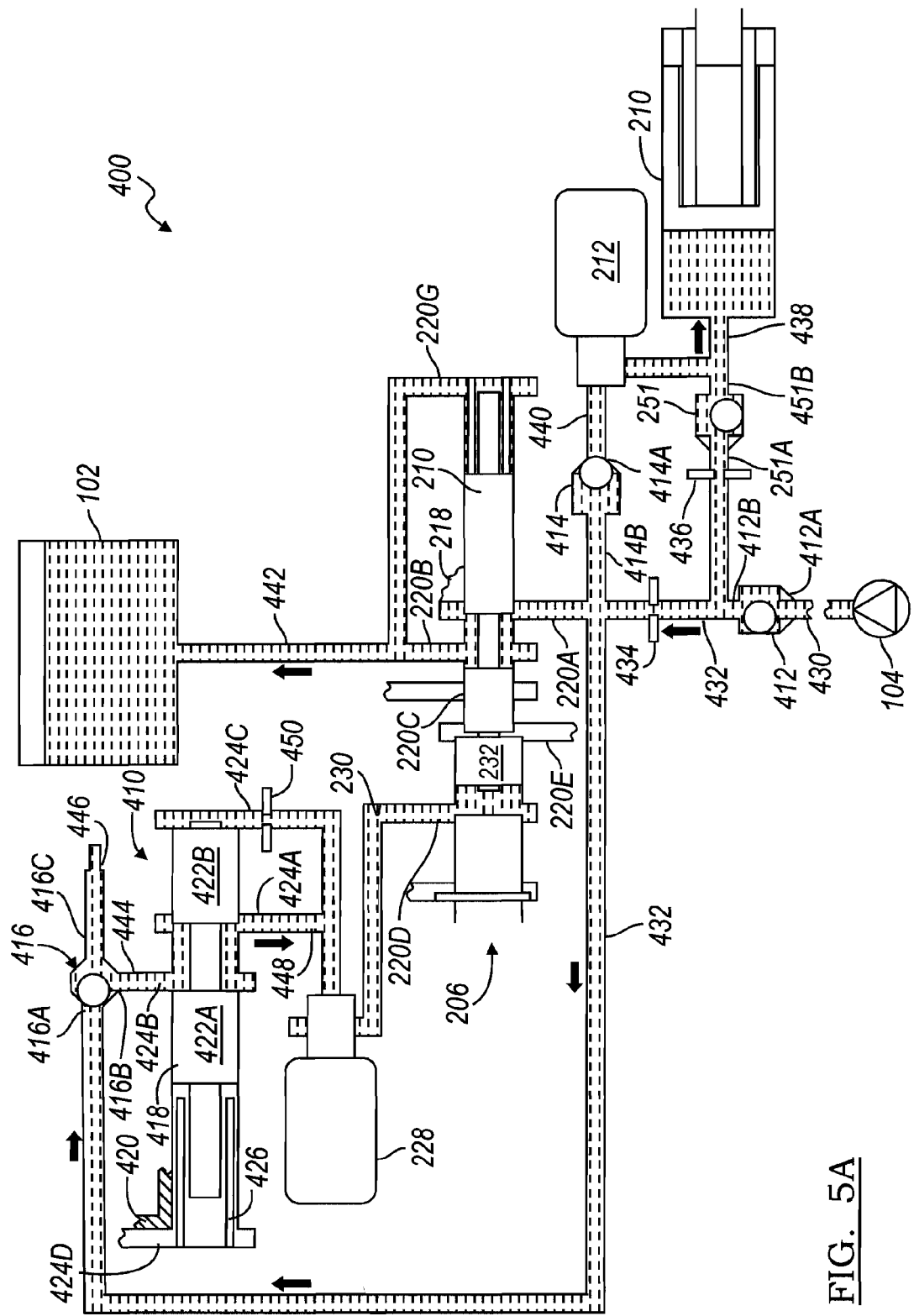
FIG. 5A is a diagram of an example of a hydraulic control system according to the principles of the present disclosure in an "engine on" mode of operation.
Figure 5B:
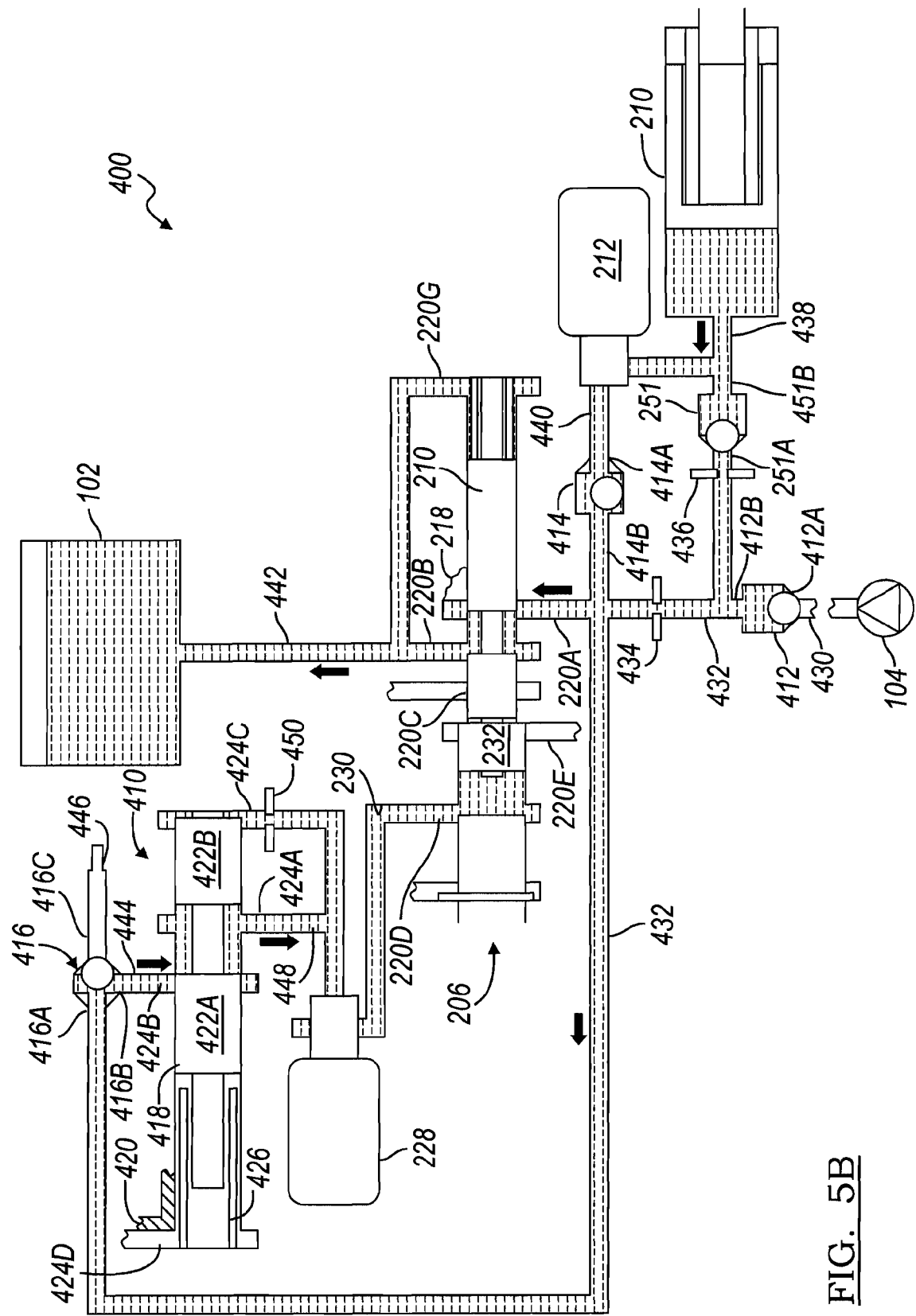
FIG. 5B is a diagram of the hydraulic control system of FIG. 5A in an "engine restart" mode of operation.

Turning to FIGS. 5A and 5B, an alternate embodiment of a hydraulic control system is generally indicated by reference number 400. The hydraulic control system 400 includes the clutch regulator valve 206, the accumulator 210, the solenoid 212, and the ball check valve 251 previously described with regards to FIGS. 3A-D. The hydraulic control system 400 also includes an actuator valve 410 and additional ball check valves 412, 414, and 416. In addition, the components of the hydraulic control system 400 are connected in a different manner than the hydraulic control system 200, as will be described below.

The actuator valve 410 includes a valve 418 slidably disposed in a valve body 420. The valve 418 is a spool valve having a plurality of lands 422A and 422B. A plurality of ports are disposed in the valve body 420 and communicate with the valve 418. For example, the actuator valve 410 includes an outlet port 424A, an inlet port 424B, a feedback port 424C, and an exhaust port 424D. It should be appreciated that the actuator valve 410 may have various other ports and configurations without departing from the scope of the present disclosure.

The valve 418 is moveable between at least two positions including a first position, shown in FIG. 5B, and a second position, shown in FIG. 5A. When the valve 418 is in the first position, the land 422A prevents the port 424A from communicating with the port 424B. A biasing member 426 disposed at an end of the valve 418 urges the valve 418 to the first position.

The ball check valve 412 includes a port 412A and a port 412B. The ball check valve 412 allows for fluid communication in one direction only. In the example provided, the ball check valve 412 allows for fluid communication from port 412A to port 412B. It should be appreciated that other types of one way valves or other control devices may be employed in the location of the ball check valve 412 without departing from the scope of the present disclosure.

The ball check valve 414 includes a port 414A and a port 414B. The ball check valve 414 allows for fluid communication in one direction only. In the example provided, the ball check valve 414 allows for fluid communication from port 414A to port 414B. It should be appreciated that other types of one way valves or other control devices may be employed in the location of the ball check valve 414 without departing from the scope of the present disclosure.

The ball check valve 416 includes a port 416A, a port 416B, and a port 416C. The ball check valve 416 selectively closes off one of the ports 416A-C based on a differential of pressurized hydraulic fluid flow within the ball check valve 416. In the example provided, the ball check valve 416 allows for fluid communication from port 416A to port 416B when the pressure of the hydraulic fluid from port 416A exceeds or equals the pressure of the hydraulic fluid from port 416C. In the example provided, the ball check valve 416 allows for fluid communication from port 416C to port 416B when the pressure of the hydraulic fluid from port 416C exceeds or equals the pressure of the hydraulic fluid from port 416A. It should be appreciated that other types of valves or other control devices may be employed in the location of the ball check valve 416 without departing from the scope of the present disclosure.

The components of the hydraulic control system 400 are connected via a plurality of fluid communication lines. It should be appreciated that the fluid communication lines may be integrated in a valve body or formed from separate tubing or piping without departing from the scope of the present disclosure. In addition, the fluid communication lines may have any cross sectional shape and may include additional or fewer bends, turns, and branches than illustrated without departing from the scope of the present disclosure. In the example provided, a fluid communication line 430 connects the pump 104 with the port 412A of the ball check valve 412. A fluid communication line 432 connects port 412B of the ball check valve 412 with port 251A of the ball check valve 251, with port 414B of the ball check valve 414, with port 220A of the regulator valve 206, and with port 416A of the ball check valve 416. An orifice 434 is disposed in the fluid communication line 432 between the ball check valve 412 and the ball check valve 414, the regulator valve 206, and the ball check valve 416. An orifice 436 is disposed in the fluid communication line 432 between, on one side, the ball check valve 412 and the orifice 434 and, on the other side, the ball check valve 251. A fluid communication line 438 connects port 251B of the ball check valve 251 with the accumulator 210 and with the solenoid 212. A fluid communication line 440 connects the solenoid 212 with port 414A of the ball check valve 414. A fluid communication line 441 connects port 220B and port 220G of the regulator valve 206 with the shift actuating device 102. A fluid communication line 444 connects port 416B of the ball check valve 416 with port 424B of the actuator valve 410. A fluid communication line 446 connects port 416C with the pump 104. Finally, a fluid communication line 448 connects port 424A of the actuator valve 410 with the actuator solenoid 228 and with port 424C of the actuator valve 410. An orifice 450 is disposed within fluid communication line 448 between port 424A and port 424C of the actuator valve 410.

The operation of the hydraulic control system 400 will now be described. The hydraulic control system 400 operates in at least two modes: a first mode, shown in FIG. 5A, wherein the engine 12 is on thereby operating the pump 104 and charging the accumulator 210, and a second mode, shown in FIG. 5B, wherein the engine 12 is off or restarting and the main pump 104 is not operating or operating at a reduced capacity and the accumulator 210 is discharging.

With reference to FIG. 5A, during the first mode of operation when the pump 104 is operational, the pump 104 provides pressurized hydraulic fluid through line 430, through the ball check valve 412, and into line 432. The hydraulic fluid from the pump 104 communicates through the ball check valve 416 and through the actuator valve 410 which moves the valve 418 into the second position to reduce the pressure of the hydraulic fluid through the actuator valve 410. The hydraulic fluid is then communicated through line 448 to the actuator solenoid 228. An electric signal from the controller 26 activates the actuator solenoid 228 thereby sending pressurized hydraulic fluid via line 230 to engage the signal land 232 and move the valve 206 to the second position. With the valve 206 in the second position, the hydraulic fluid from line 432 is also communicated through the regulator valve 206 to line 442 where the hydraulic fluid is delivered to the shift actuating device 102. Hydraulic fluid in line 432 also communicates through the orifice 436, through the ball check valve 251, and through the line 438 to the accumulator 210. The accumulator 210 is charged by closing the solenoid 212 and the ball check valve 251 prevents the hydraulic fluid from exiting the accumulator 210. Keeping the solenoid 212 closed in turn keeps the accumulator 210 energized.

With reference to FIG. 5B, when the motor vehicle stops (i.e., at a red light for example), the engine shuts off and the main pump 104 stops rotating, so there is no pressure in the hydraulic circuit providing oil to the torque transmitting device 24. To start the motor vehicle without delay, the hydraulic circuit must be filled with pressurized hydraulic fluid. Accordingly, during engine restart, line 430 and 446 are not supplied with pressurized hydraulic fluid immediately. To discharge the accumulator 210, the solenoid 212 is opened. Pressurized hydraulic fluid is communicated through line 438, through the solenoid 212, through line 440, through the ball check valve 414, and into line 432. The ball check valve 412 prevents the hydraulic fluid from backfilling into the pump 104 and other hydraulic control modules. The hydraulic fluid enters the actuator valve 410 through the ball check valve 416 and supplies hydraulic fluid to the solenoid 228, thereby keeping the regulator valve 206 in the second position. This allows the hydraulic fluid in line 432 to communicate through the regulator valve 206 into line 442 which feeds the hydraulic fluid to the shift actuating device 102.

The description of the invention is merely exemplary in nature and variations that do not depart from the gist of the invention are intended to be within the scope of the invention. Such variations are not to be regarded as a departure from the spirit and scope of the invention.

We claim the following:

1. A hydraulic control system for actuating at least one torque transmitting device in a powertrain, the powertrain having an engine and a transmission, the hydraulic control system comprising:
    a source of pressurized hydraulic fluid powered by the engine;
    an actuator for selectively actuating the at least one torque transmitting device;
    a relay valve in communication with the actuator, the relay valve moveable between a first position and a second position wherein the relay valve prevents communication between the source of pressurized hydraulic fluid and the actuator when in the first position and wherein the relay valve allows communication between the source of pressurized hydraulic fluid and the actuator when in the second position;
    an accumulator for storing and releasing the hydraulic fluid, the accumulator in communication with the actuator and the source of pressurized hydraulic fluid;
    a first control device disposed between the accumulator and the source of pressurized hydraulic fluid, the first control device having an open condition for allowing fluid communication between the accumulator and the source of pressurized hydraulic fluid and a closed condition for preventing fluid communication between the accumulator and the source of pressurized hydraulic fluid;
    a second control device disposed between the accumulator and the actuator, the second control device having an open condition for allowing fluid communication between the accumulator and the actuator and a closed condition for preventing fluid communication between the accumulator and the actuator;
    wherein the accumulator is charged with the hydraulic fluid when the engine is on and the first control device is open, wherein the accumulator stores the hydraulic fluid when the first control device and the second control device are closed, and wherein the accumulator releases the hydraulic fluid when the second control device is open and the relay valve is in the first position.

2. The hydraulic control system of claim 1 further comprising a regulator valve in communication with the relay valve and the source of pressurized hydraulic fluid, the regulator valve moveable between a first position and a second position wherein the regulator valve prevents communication between the source of pressurized hydraulic fluid and the relay valve when in the first position and wherein the regulator valve allows communication between the source of pressurized hydraulic fluid and the relay valve when in the second position.

3. The hydraulic control system of claim 1 wherein the first control device is a one way ball check valve that allows fluid communication from the source of pressurized hydraulic fluid to the accumulator and prevents fluid communication from the accumulator to the source of pressurized hydraulic fluid.

4. The hydraulic control system of claim 1 wherein the second control device is an on/off solenoid.

5. The hydraulic control system of claim 1 wherein the relay valve is moved to the second position by pressurized hydraulic fluid from the source of pressurized hydraulic fluid when the engine is on and wherein the relay valve is moved to the first position by a biasing member when the engine is off.

6. The hydraulic control system of claim 1 further comprising a third control device disposed in series relationship with the second control device, the accumulator, and the actuator, wherein the third control device includes an open condition for allowing fluid communication between the accumulator and the actuator and a closed condition for preventing fluid communication between the accumulator and the actuator.

7. The hydraulic control system of claim 6 wherein the third control device is an on/off solenoid.

8. The hydraulic control system of claim 1 further comprising a fourth control device disposed in series relationship with the actuator, the second control device, the first control device, and the accumulator, wherein the fourth control device includes an open condition for allowing fluid communication between the accumulator and the actuator and a closed condition for preventing fluid communication between the accumulator and the actuator.

9. The hydraulic control system of claim 8 wherein the fourth control device is a one way ball check valve that allows fluid communication from the accumulator to the actuator and prevents fluid communication from the actuator to the accumulator.

10. A hydraulic control system for actuating at least one torque transmitting device in a powertrain, the powertrain having an engine and a transmission, the hydraulic control system comprising:
a source of pressurized hydraulic fluid powered by the engine;
an actuator for selectively actuating the at least one torque transmitting device;
a regulator valve having a first port in communication with the source of pressurized hydraulic fluid and a second port, the regulator valve having a valve moveable between a first position and a second position, wherein the first port of the regulator valve is not in communication with the second port of the regulator valve when the valve is in the first position and wherein the first port of the regulator valve is in communication with the second port of the regulator valve when the valve is in the second position;
a relay valve having a first port in communication with the second port of the regulator valve, a second port in communication with the actuator, and a third port in communication with the source of pressurized hydraulic fluid, the relay valve having a valve moveable between a first position and a second position wherein the first port of the relay valve is not in communication with the second port of the relay valve when the valve is in the first position and wherein the first port of the relay valve is in communication with the second port of the relay valve when the valve is in the second position;
an accumulator for storing and releasing the hydraulic fluid, the accumulator in communication with the actuator and the source of pressurized hydraulic fluid;
a first control device disposed between the accumulator and the source of pressurized hydraulic fluid, the first control device having an open condition for allowing fluid communication between the accumulator and the source of pressurized hydraulic fluid and a closed condition for preventing fluid communication between the accumulator and the source of pressurized hydraulic fluid;
a second control device disposed between the accumulator and the actuator, the second control device having an open condition for allowing fluid communication between the accumulator and the actuator and a closed condition for preventing fluid communication between the accumulator and the actuator;
wherein the accumulator is charged with the hydraulic fluid when the engine is on, the first control device is open, the regulator valve is in the second position, and the relay valve is in the second position, wherein the accumulator stores the hydraulic fluid when the first control device and the second control device are closed, and wherein the accumulator releases the hydraulic fluid when the second control device is open and the relay valve is in the first position.

11. The hydraulic control system of claim 10 wherein the first control device is in further communication with the third port of the relay valve.

12. The hydraulic control system of claim 10 wherein the first control device is a one way ball check valve that allows fluid communication from the source of pressurized hydraulic fluid to the accumulator and prevents fluid communication from the accumulator to the source of pressurized hydraulic fluid.

13. The hydraulic control system of claim 10 wherein the second control device is an on/off solenoid.

14. The hydraulic control system of claim 10 wherein the relay valve is moved to the second position by pressurized hydraulic fluid from the source of pressurized hydraulic fluid when the engine is on and wherein the relay valve is moved to the first position by a biasing member when the engine is off.

15. The hydraulic control system of claim 10 wherein the first control device is in further communication with the second port of the relay valve.

16. The hydraulic control system of claim 15 wherein the first control device communicates with the accumulator through the second control device.

17. The hydraulic control system of claim 10 further comprising a third control device disposed in series relationship with the second control device, the accumulator, and the actuator, wherein the third control device includes an open condition for allowing fluid communication between the accumulator and the actuator and a closed condition for preventing fluid communication between the accumulator and the actuator.

18. The hydraulic control system of claim 17 wherein the third control device is an on/off solenoid.

19. The hydraulic control system of claim 10 further comprising a fourth control device disposed in series relationship with the actuator, the second control device, the first control device, and the accumulator, wherein the fourth control device includes an open condition for allowing fluid communication between the accumulator and the actuator and a closed condition for preventing fluid communication between the accumulator and the actuator.

20. The hydraulic control system of claim 19 wherein the fourth control device is a one way ball check valve that allows fluid communication from the accumulator to the actuator and prevents fluid communication from the actuator to the accumulator.

* * * * *